UNITED STATES PATENT OFFICE.

JENS DEDICHEN, OF BERLIN-HALENSEE, GERMANY, ASSIGNOR TO ACTIEN GESELL-SCHAFT FÜR ANILIN FABRIKATION, OF BERLIN, GERMANY.

MANUFACTURE OF DIAZOTIZABLE TRISAZO DYES.

1,416,621.     Specification of Letters Patent.     Patented May 16, 1922.

No Drawing.     Application filed August 15, 1921. Serial No. 492,482.

*To all whom it may concern:*

Be it known that I, JENS DEDICHEN, a citizen of Norway, residing at Berlin-Halensee, Germany, my post-office address being Seesenerstrasse 25, Berlin-Halensee, Germany, have invented certain new and useful Improvements in the Manufacture of Diazotizable Trisazo Dyes, (for which I have made application in Germany June 29, 1915, and in Austria December 27, 1915,) of which the following is a specification.

The object of this invention is new trisazo dyes which dye cotton directly and on the fibre can be diazotized and coupled with a suitable compound thus giving more or less bluish gray dyeings remarkable as well by their evenness as by their fastness to light and to washing.

These new dyes derive from an aminoaryl sulfonic acid two molecular proportions of middle components and 2-amino-8-naphthol-6-sulfonic acid. They are of the type:

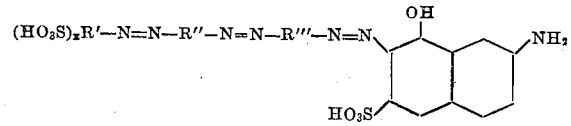

where R' means an aromatic radicle and R'' and R''' are aromatic radicles sulfonated or not. A process of the manufacture consists in combining a diazoarylsulfonic acid with an azo-dye-component capable of being diazotized after being combined, diazotizing the intermediate compound, combining it with the same or another middle component, diazotizing the new intermediate compound, diazotizing again and finally combining with 2-amino-8-naphthol-6-sulfonic acid in the presence of an alkali.

The new trisazo dyes in the shape of pulverized dry sodium salts are blackish powders soluble in water to bluish black solutions not being altered by soda lye but from which the dyes are separated by hydrochloric acid. Concentrated sulfuric acid dissolves the dyes to blackish green solutions, the violet black dyes settling out on addition of ice. Strong reducing agents decompose the dyes. From an alkaline bath cotton is dyed reddish blue tints; after diazotation on the fibre and combination with 2-naphthol or meta-toluylenediamine bluish green shades are obtained.

In order to illustrate in which manner the dyes may be manufactured, without limiting the invention, the following examples are given, the parts being by weight:

1. The diazo compound made as usual from 17.3 parts of metanilic acid is combined with 18 parts of 1-naphthylamine hydrochloride. The separated dye is dissolved in diluted soda lye and diazotized by means of hydrochloric acid and sodium nitrite. The diazo compound may be filtered off. It is then suspended in water and introduced into an aqueous solution of 24.5 parts of sodium-1-naphthylamine-6 or 7-sulfonate and an excess of sodium acetate. The intermediate product is separated, dissolved and diazotized by hydrochloric acid and nitrite. The diazo-compound is introduced into a cold solution of 24 parts of 2-amino-8-naphthol-6-sulfonic acid, maintained alkaline by sodium carbonate. The trisazo dye is salted out and dried. It probably corresponds to the formula:

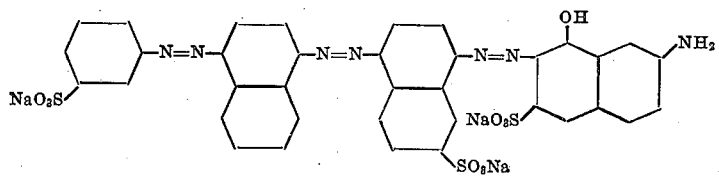

The metanilic acid may be replaced for instance by a chloroaniline sulfonic acid.

2. The diazo-compound prepared from 32.5 parts of 2-naphthylamine-4.8-disulfonic acid (mono-sodium salt) is combined with 13.7 parts of 3-amino-4-methoxy-1-methylbenzene, previously dissolved in water and 22 parts of hydrochloric acid of 12° Bé. The intermediate product is further diazotized as indicated in the foregoing example and combined firstly with 1-naphthylamine-6-(7)-sulfonic acid and after a repeated diazotation with 2-amino-8-naphthol-6-sulfonic acid in the presence of an alkali.

When 3-amino-4-methoxy-1-methylbenzene is replaced by 1-naphthylamine-6- or 7-sulfonic acid a similar dye is produced.

Having now described my invention what I claim is,—

1. The new trisazo dyes which are derived from an aminoarylsulfonic acid, two molecular proportions of middle components and 2-amino-8-naphthol-6-sulfonic acid and correspond to the general formula:

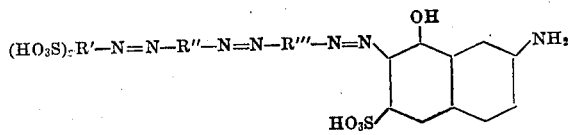

where R' means an aromatic radicle and R'' and R''' are aromatic radicles sulfonated or not; in the shape of pulverized dry sodium salts being blackish powders soluble in water to bluish black solutions not being altered by soda lye but the dyes being separated by hydrochloric acid; soluble in concentrated sulfuric acid to blackish green solutions from which the violet black dyes settle out on addition of ice; being destroyed by strong reducing agents; dyeing cotton reddish blue tints, after diazotation and combination with 2-naphthol or meta-toluylenediamine turning to bluish gray.

2. The new trisazo dye which is derived from metanilic acid, 1-naphthylamine, 1-naphthylamine-6-(7)-sulfonic acid and 2-amino-8-naphthol-6-sulfonic acid and probably corresponds to the formula:

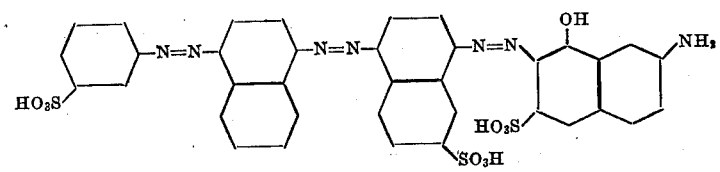

in the shape of pulverized dry sodium salt being a blackish powder soluble in water to a bluish black solution not being altered by soda lye but by hydrocholoric acid the dye being separated; soluble in concentrated sulfuric acid to a blackish green solution from which the violet black dye settles out on addition of ice; being destroyed by strong reducing agents; dying cotton reddish blue tints, after diazotation and combination with 2-naphthol or meta-toluylenediamine turning to bluish gray.

In testimony whereof I have affixed my signature in presence of two witnesses.

JENS DEDICHEN.

Witnesses:
HENRY HARPER,
ALLEN F. JENNINGS.